United States Patent
Keuleyan et al.

(10) Patent No.: US 12,523,748 B2
(45) Date of Patent: Jan. 13, 2026

(54) DETECTOR HAVING QUANTUM DOT PN JUNCTION PHOTODIODE

(71) Applicant: Allegro MicroSystems, LLC, Manchester, NH (US)

(72) Inventors: Sean Keuleyan, Eugene, OR (US); Andrew S. Huntington, Banks, OR (US); Nanditha Dissanayake, Portland, OR (US); Chao Yi, Eugene, OR (US); George Williams, Vashon, WA (US)

(73) Assignee: Allegro MicroSystems, LLC, Manchester, NH (US)

( * ) Notice: Subject to any disclaimer, the term of this patent is extended or adjusted under 35 U.S.C. 154(b) by 982 days.

(21) Appl. No.: 17/653,881

(22) Filed: Mar. 8, 2022

(65) Prior Publication Data

US 2023/0288540 A1  Sep. 14, 2023

(51) Int. Cl.
| | |
|---|---|
| *G01S 7/481* | (2006.01) |
| *G01S 7/484* | (2006.01) |
| *G01S 7/4865* | (2020.01) |
| *G01S 17/10* | (2020.01) |

(52) U.S. Cl.
CPC .......... *G01S 7/4816* (2013.01); *G01S 7/4814* (2013.01); *G01S 7/484* (2013.01); *G01S 7/4865* (2013.01); *G01S 17/10* (2013.01)

(58) Field of Classification Search
CPC . G01S 7/4816; H10F 30/2218; H10F 77/1433
See application file for complete search history.

(56) References Cited

U.S. PATENT DOCUMENTS

| | | | |
|---|---|---|---|
| 6,100,586 A  * | 8/2000 | Chen | H10H 20/832 |
| | | | 257/745 |
| 6,760,145 B1 | 7/2004 | Taylor et al. | |
| 6,778,728 B2 | 8/2004 | Taylor et al. | |
| 6,894,823 B2 | 5/2005 | Taylor et al. | |
| 6,989,921 B2 | 1/2006 | Bernstein et al. | |
| 7,015,780 B2 | 3/2006 | Bernstein et al. | |
| 7,160,753 B2 | 1/2007 | Williams, Jr. | |
| 7,432,537 B1 | 10/2008 | Huntington | |
| 7,504,053 B1 | 3/2009 | Alekel | |
| 7,764,719 B2 | 7/2010 | Munroe et al. | |
| 7,782,911 B2 | 8/2010 | Munroe et al. | |
| 7,852,549 B2 | 12/2010 | Alekel et al. | |
| 7,885,298 B2 | 2/2011 | Munroe | |
| 7,919,018 B2 | 4/2011 | Williams et al. | |
| 7,994,421 B2 | 8/2011 | Williams et al. | |

(Continued)

FOREIGN PATENT DOCUMENTS

| | | | | |
|---|---|---|---|---|
| TW | 201422772 | | 6/2014 | |
| WO | WO-2018111220 A1 | * | 6/2018 | ........... H10D 12/211 |

OTHER PUBLICATIONS

U.S. Appl. No. 17/197,314, filed Mar. 10, 2021, Taylor et al.

(Continued)

*Primary Examiner* — Robert W Hodge
*Assistant Examiner* — Clara G Chilton
(74) *Attorney, Agent, or Firm* — DALY, CROWLEY, MOFFORD & DURKEE, LLP

(57) ABSTRACT

Methods and apparatus for a sensor having a photodetector array having photodetectors comprising a colloidal quantum dot (CQD) structure formed on an integrated circuit. The sensor may comprise a LIDAR time of flight sensor.

48 Claims, 8 Drawing Sheets

(56) References Cited

U.S. PATENT DOCUMENTS

| | | |
|---|---|---|
| 8,207,484 B1 | 6/2012 | Williams |
| 8,319,307 B1 | 11/2012 | Williams |
| 8,570,372 B2 | 10/2013 | Russell |
| 8,597,544 B2 | 12/2013 | Alekel |
| 8,630,036 B2 | 1/2014 | Munroe |
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,368,933 B1 | 6/2016 | Nijjar et al. |
| 9,373,736 B2 | 6/2016 | Sargent et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,570,502 B2 | 2/2017 | Sargent et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,290,753 B2 | 5/2019 | Guyot-Sionnest et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| RE48,454 E | 3/2021 | Schut et al. |
| 2009/0224218 A1 | 9/2009 | Williams et al. |
| 2016/0355258 A1 | 12/2016 | Williams et al. |
| 2018/0069367 A1 | 3/2018 | Villeneuve et al. |
| 2018/0091747 A1* | 3/2018 | Rhee ............... G01S 17/89 |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |
| 2019/0310368 A1 | 10/2019 | LaChapelle |
| 2020/0357939 A1 | 11/2020 | Law et al. |
| 2020/0389606 A1* | 12/2020 | Petilli ............... G05D 1/0289 |
| 2022/0231244 A1* | 7/2022 | Klem ............... H10K 30/88 |

OTHER PUBLICATIONS

U.S. Appl. No. 17/197,328, filed Mar. 30, 2021, Taylor et al.
U.S. Appl. No. 17/230,253, filed Apr. 14, 2021, Judkins, III et al.
U.S. Appl. No. 17/230,276, filed Apr. 14, 2021, Cadugan.
U.S. Appl. No. 17/230,277, filed Apr. 14, 2021, Judkins, III et al.
U.S. Appl. No. 17/352,829, filed Jun. 21, 2021, Huntington et al.
U.S. Appl. No. 17/352,937, filed Jun. 21, 2021, Cadugan et al.
U.S. Appl. No. 17/376,607, filed Jul. 15, 2021, Stewart et al.
U.S. Appl. No. 17/400,300, filed Aug. 12, 2021, Myers et al.
U.S. Appl. No. 17/402,065, filed Aug. 13, 2021, Lee et al.
U.S. Appl. No. 17/566,763, filed Dec. 31, 2021, Huntington et al.
U.S. Appl. No. 17/648,702, filed Jan. 24, 2022, Lee et al.
U.S. Appl. No. 17/651,250, filed Feb. 16, 2022, Marshall.
U.S. Appl. No. 17/656,977, filed Mar. 29, 2022, Myers et al.

(56) References Cited

OTHER PUBLICATIONS

U.S. Appl. No. 17/656,978, filed Mar. 29, 2022, Myers et al.
U.S. Appl. No. 17/656,981, filed Mar. 29, 2022, Myers et al.

* cited by examiner

DETECTOR HAVING QUANTUM DOT PN JUNCTION PHOTODIODE

BACKGROUND

As is known in the art, some known ranging systems can include laser radar (ladar), light-detection and ranging (lidar), and range-finding systems, to measure the distance to objects in a scene. A laser ranging and imaging system transmits laser light toward a particular location and measures the reflected light to extract ranges to objects at the location, from which a three-dimensional representation of the objects can be computed.

Time-of-flight laser ranging systems generally work by emitting a laser pulse and recording the time it takes for the laser pulse to travel to a target, reflect, and return to a photoreceiver. The laser ranging instrument records the time of the outgoing pulse and records the time that a laser pulse returns. The difference between these two times is the time of flight to and from the target. Using the speed of light, the round-trip time of the pulses is used to calculate the distance to the target.

Coherent laser ranging systems obtain target range—and often, velocity—from the phase relationships embedded in transmitted and reflected light. Phase differences between two coherent signals can be measured based on the resulting interference pattern of light intensity that oscillates in time and space. In a common implementation of frequency-modulated (FM) lidar, the frequency of a laser is varied over time (chirped), so that when the reflected signal is heterodyned with the local signal, the changing phase difference between the two at a particular point in space causes the intensity of a component of the mixed signal to oscillate in time at the frequency difference between the two. This can be converted into a measurement of the round-trip time-of-flight, based on the rate of frequency chirp; frequency shifts due to the doppler effect can be measured in a similar manner to get the velocity of a target relative to the sensor. Other coherent lidar systems capture spatial interferograms that can be used to reconstruct the three-dimensional shape of a target using holographic techniques.

Focal plane arrays (FPAs)—a term used hereafter for any regular arrangement of multiple photodetector elements, and not just for those detector arrays positioned at the image plane of an optical system—can be used in a lidar system to detect laser light reflected by targets as well as the interference pattern formed by coherent mixing of reflected light with light from an optical local oscillator. Very often, FPAs for sensing infrared light comprise a separate detector array and an accompanying readout integrated circuit (ROIC)—a term used hereafter for any multi-channel application-specific integrated circuit (ASIC) that is used to operate a detector array, including such circuits that output signals in real time, and not just those which employ a readout architecture. Such ROICs are fabricated separately from the photodetector array and must be hybridized to the detector array, such as by bump bonding, which incurs costs and reduces manufacturing efficiency.

SUMMARY

Embodiments of the disclosure provide methods and apparatus for photodetection sensors having deposited colloidal quantum dot (CQD)-based photo-detector layers formed on circuitry, such as on complementary metal-oxide-semiconductor (CMOS) readout integrated circuits (ROICs) at wafer scale. In embodiments, layers of the CQD detector are optimized for responding to nanosecond-scale laser pulses and modulations of light intensity as opposed to measuring the intensity of continuous-wave signals over long exposures.

Example embodiments of a CQD-based photo-detector may be configured for LIDAR applications, which have relatively short photocurrent rise times in response to nanosecond-scale laser pulses and modulations of light intensity due to operation under reverse bias with a wide depletion region. In some embodiments, the depletion region may exist in and between weakly p- and n-doped layers. In other embodiments, the depletion region exists in and is between a weakly p-doped layer and a heavily dope n-type transparent conductive oxide. A photodiode may be fabricated on a CMOS ROIC with a metal anode, which many comprise, for example, TiN, Al, and/or Au.

In embodiments, the detector substrate may be modified using a molecular self-assembled monolayer for adhesion and improved hole collection efficiency and the photodiode structure may include hole-transport and electron-blocking layers for efficient collection of photogenerated holes and blocking electron injection from the anode. The p-type quantum dot layer doping and thickness may be optimized for a wide depletion region for efficient absorption of infrared light and collection of photogenerated holes. The n-type quantum dot layer doping and thickness may be optimized for wide depletion for efficient absorption of infrared light and collection of photogenerated electrons. In some embodiments, the photodiode structure may include an electron-transport and hole-blocking layer for efficient collection of photogenerated electrons and blocking hole injection from the cathode.

In embodiments, the photodiode cathode may be a conductor transparent at the operating wavelength. The cathode may comprise a transparent conducting oxide, thin metal, nanoparticle film, nanowire film, doped semiconductor, polymer, and/or the like. The cathode thickness may be selected to maximize light absorption in the absorber layer. In embodiments, layer thicknesses may be optimized for absorption, CQD spatial orientation optimized for charge transport, and/or wide depletion region for high collection efficiency of photogenerated carriers and fast photocurrent rise time. In some embodiments, a sensor includes on-chip current or charge amplification, pulse detection and timing, or pulse- or waveform-sampling circuitry.

In one aspect, a LIDAR sensor comprises: a photodetector array having one or more photodetectors comprising colloidal quantum dots (CQDs), wherein the photodetector array is responsive to light transmitted at a known time and received by the photodetector array after reflection from a target for determining a distance from the target to the sensor, or to light with an interference pattern in time and space produced by coherent mixing of light reflected from a target with light from an optical local oscillator for determining a distance from the target to the sensor based on phase or frequency relationships extracted from the interference pattern; and an integrated circuit, wherein the photodetector array is formed on the integrated circuit.

A sensor can further include one or more of the following features: the sensor includes a laser transmitter configured to transmit the light at a known time, the sensor includes a laser transmitter configured to vary the frequency of the transmitted light over time such that the laser frequency at any given time is known, the sensor includes a laser transmitter and an optical local oscillator, where the laser transmitter is configured to transmit light to a remote target with a known phase relationship at the time of transmission to the light of the optical local oscillator, and the laser and optical local oscillator are the same light source, the sensor includes a laser transmitter and an optical local oscillator, where the laser transmitter is configured to transmit light to a remote target with a known phase relationship at the time of transmission to the light of the optical local oscillator, and the laser and optical local oscillator are different light sources, a signal processing circuit to determine the distance from the sensor to the target, a signal processing circuit to determine the distance from the sensor to the target or the relative velocity between sensor and target, the sensor includes a laser transmitter and an optical local oscillator, where the laser transmitter is configured to transmit light to a remote target with a known phase relationship at the time of transmission to the light of the optical local oscillator, and further including a signal processing circuit to reconstruct a three-dimensional image of the target from an interferogram produced by coherent mixing of the reflected laser light with light from the optical local oscillator, the integrated circuit comprises a readout integrated circuit (ROIC), the ROIC comprises CMOS circuitry, the photodetector array forms part of a focal plane array (FPA), the photodetectors comprise photodiodes having an anode, a p-type layer, an n-type layer, and a cathode, the CQD structure comprises a doped p-type layer, an n-type doped layer, and an electron-selective (hole-blocking) layer, wherein the doped p-type layer and the n-type doped layer comprise lead sulfide CQDs, the electron-selective (hole-blocking) layer comprises zinc oxide, C60 fullerenes, or phenyl-C61-butyric acid methyl ester (PCBM), the lead sulfide doped p-type and the n-type doped layers and the zinc oxide layer comprise nanocrystal colloidal quantum dots packed in a film, the photodetector includes a photodiode having a depletion region between weakly p- and n-doped layers, the photodetector comprises a photodiode including a depletion region between a weakly p-doped layer and a heavily doped n-type transparent conductive oxide, the photodetector comprises a photodiode having a metal anode formed from a material that includes TiN, Ni, Al, and/or Au, the photodetector comprises a photodiode having hole-transport and electron-blocking layers for efficient collection of photogenerated holes and blocking electron injection from an anode, the CQD structure comprises doping and/or thickness selection for the p-type layer optimized for a wide depletion region for efficient absorption of infrared light and collection of photogenerated holes, the doping and/or thickness for the n-type layer is optimized for a wide depletion region for efficient absorption of infrared light and collection of photogenerated electrons, the photodetector comprises a photodiode, wherein a cathode of the photodiode is a conductor transparent at an operating wavelength, the cathode comprises a transparent conducting oxide, thin metal, nanoparticle film, doped semiconductor, and/or polymer, and/or the cathode comprises tin doped indium oxide (indium tin oxide, ITO), aluminum doped zinc oxide (AZO), Al, and/or Ag.

In another aspect, a method comprises: employing a LIDAR sensor including a photodetector array having one or more photodetectors comprising colloidal quantum dots (CQDs), wherein the photodetector array is responsive to light transmitted at a known time and received by the photodetector array after reflection from a target for determining a distance from the target to the sensor, or to light with an interference pattern in time and space produced by coherent mixing of light reflected from a target with light from an optical local oscillator for determining a distance from the target to the sensor based on phase or frequency relationships extracted from the interference pattern, wherein the photodetector array is formed on an integrated circuit.

In another aspect, a method can further include one or more of the following features: the sensor includes a laser transmitter configured to transmit the light at a known time, the sensor includes a laser transmitter configured to vary the frequency of the transmitted light over time such that the laser frequency at any given time is known, the sensor includes a laser transmitter and an optical local oscillator, where the laser transmitter is configured to transmit light to a remote target with a known phase relationship at the time of transmission to the light of the optical local oscillator, and the laser and optical local oscillator are the same light source, the sensor includes a laser transmitter and an optical local oscillator, where the laser transmitter is configured to transmit light to a remote target with a known phase relationship at the time of transmission to the light of the optical local oscillator, and the laser and optical local oscillator are different light sources, a signal processing circuit to determine the distance from the sensor to the target, a signal processing circuit to determine the distance from the sensor to the target or the relative velocity between sensor and target, the sensor includes a laser transmitter and an optical local oscillator, where the laser transmitter is configured to transmit light to a remote target with a known phase relationship at the time of transmission to the light of the optical local oscillator, and further including a signal processing circuit to reconstruct a three-dimensional image of the target from an interferogram produced by coherent mixing of the reflected laser light with light from the optical local oscillator, the integrated circuit comprises a readout integrated circuit (ROIC), the ROIC comprises CMOS circuitry, the photodetector array forms part of a focal plane array (FPA), the photodetectors comprise photodiodes having an anode, a p-type layer, an n-type layer, and a cathode, the CQD structure comprises a doped p-type layer, an n-type doped layer, and an electron-selective (hole-blocking) layer, wherein the doped p-type layer and the n-type doped layer comprise lead sulfide CQDs, the electron-selective (hole-blocking) layer comprises zinc oxide, C60 fullerenes, or phenyl-C61-butyric acid methyl ester (PCBM), the lead sulfide doped p-type and the n-type doped layers and the zinc oxide layer comprise nanocrystal colloidal quantum dots packed in a film, the photodetector includes a photodiode having a depletion region between weakly p- and n-doped layers, the photodetector comprises a photodiode including a depletion region between a weakly p-doped layer and a heavily doped n-type transparent conductive oxide, the photodetector comprises a photodiode having a metal anode formed from a material that includes TiN, Ni, Al, and/or Au, the photodetector comprises a photodiode having hole-transport and electron-blocking layers for efficient collection of photogenerated holes and blocking electron injection from an anode, the CQD structure comprises doping and/or thickness selection for the p-type layer optimized for a wide depletion region for efficient absorption of infrared light and collection of photogenerated holes, the doping and/or thickness for the n-type layer is optimized for a wide depletion region for efficient absorption of infrared light and collection of photogenerated electrons, the photodetector comprises a photodiode, wherein a cathode of the photodiode is a conductor transparent at an operating wavelength, the cathode comprises a transparent conducting oxide, thin metal, nanoparticle film, doped semiconductor, and/or polymer, and/or the cathode comprises tin doped indium oxide (indium tin oxide, ITO), aluminum doped zinc oxide (AZO), Al, and/or Ag.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
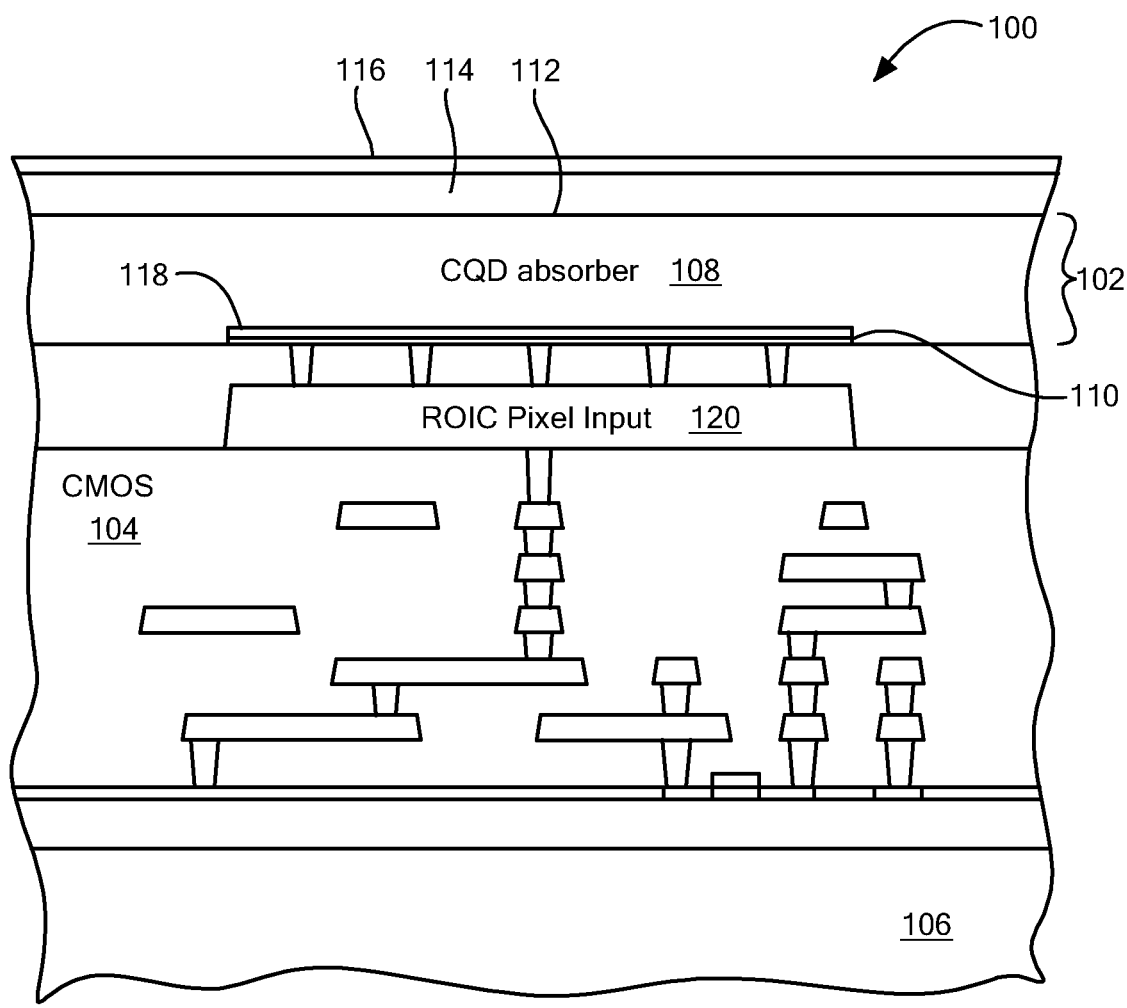
FIG. 1 is a cross-sectional view of an example sensor having a CQD photodiode formed on circuitry.

Prior to describing example embodiments of the disclosure some information is provided. Laser ranging systems can include laser radar (ladar), light-detection and ranging (lidar), and rangefinding systems, which are generic terms for the same class of instrument that uses light to measure the distance to objects in a scene. This concept is similar to radar, except optical signals are used instead of radio waves. Similar to radar, a laser ranging and imaging system emits light toward a particular location and measures the reflected light to extract the range.

Time-of-flight laser ranging systems generally work by emitting a laser pulse and recording the time it takes for the laser pulse to travel to a target, reflect, and return to a photoreceiver. The laser ranging instrument records the time of the outgoing pulse—either from a trigger or from measurement of the small portion of the outgoing laser light that is scattered at the sensor's aperture—and then records the time that a laser pulse returns. The difference between these two times is the time of flight to and from the target. Using the speed of light, the round-trip time of the pulses is used to calculate the distance to the target.

Coherent laser ranging systems obtain target range—and often, velocity—from the phase relationships embedded in transmitted and reflected light. Phase differences between two coherent signals can be measured based on the resulting interference pattern of light intensity that oscillates in time and space. In a common implementation of frequency-modulated (FM) lidar, the frequency of a laser is varied over time (chirped), so that when the reflected signal is heterodyned with the local signal, the changing phase difference between the two at a particular point in space causes the intensity of a component of the mixed signal to oscillate in time at the frequency difference between the two. This can be converted into a measurement of the round-trip time-of-flight, based on the rate of frequency chirp; frequency shifts due to the doppler effect can be measured in a similar manner to get the velocity of a target relative to the sensor. Other coherent lidar systems capture spatial interferograms that can be used to reconstruct the three-dimensional shape of a target using holographic techniques.

Lidar systems may scan the beam across a target area to sequentially measure the distance to multiple points across the field of view, or illuminate the entire target area at once, producing a full three-dimensional range profile of the scene. Advanced time-of-flight flash lidar cameras, for example, contain an array of photoreceiver pixel elements, each able to record the times of flight to objects in their fields of view. Some coherent lidar cameras use arrays of pixel elements to image an interferogram constructed by mixing the signal reflected from the entire scene with an optical local oscillator.

When using light pulses to create images in a time-of-flight lidar system, the emitted pulse may intercept multiple objects, at different orientations, as the pulse traverses a 3D volume of space. The echoed laser-pulse waveform contains a temporal and amplitude imprint of the scene. By sampling the light echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images. In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHz). This process generates digitized waveforms (amplitude versus time) that may be processed to achieve higher-fidelity 3D images.

Of the various time-of-flight laser ranging instruments available, those with single-element photoreceivers generally obtain range data along a single range vector, at a fixed pointing angle. This type of instrument—which is, for example, commonly used by golfers and hunters—either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angle of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the return laser pulses, these instruments obtain a 3D data set (e.g., angle, angle, range$_n$), where the index n is used to reflect that a series of range-resolved laser pulse returns can be collected, not just the first reflection. It is understood that multiple return pulses may be within a solid angle of collection for a single pixel.

Some time-of-flight 3D lidar instruments are also capable of collecting the intensity of the reflected pulse returns generated by the objects located at the resolved (angle, angle, range) objects in the scene. When both the range and intensity are recorded, a multi-dimensional data set [e.g., angle, angle, (range-intensity)$_n$] is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar systems can include different types of lasers, including those operating at different wavelengths, including those that are not visible (e.g., those operating at a wavelength of 840 nm or 905 nm), and in the near-infrared (e.g., those operating at a wavelength of 1064 nm or 1550 nm), and the thermal infrared including those operating at wavelengths known as the "eyesafe" spectral region (i.e., generally those operating at a wavelength beyond 1300-nm, which is blocked by the cornea), where ocular damage is less likely to occur. Lidar transmitters are generally invisible to the human eye. However, when the wavelength of the laser is close to the range of sensitivity of the human eye—roughly 350 nm to 730 nm—the light may pass through the cornea and be focused onto the retina, such that the energy of the laser pulse and/or the average power of the laser must be lowered to prevent ocular damage. Thus, a laser operating at, for example, 1550 nm, can—without causing ocular damage—generally have 200 times to 1 million times more laser pulse energy than a laser operating at 840 nm or 905 nm.

One challenge for a lidar system is detecting poorly reflective objects at long distance, which requires transmitting a laser pulse with enough energy that the return signal—reflected from the distant target—is of sufficient magnitude to be detected. To determine the minimum required laser transmission power, several factors must be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those reflective objects that are not diffusively-scattering objects), the collimated laser beams can be directly reflected back, largely unattenuated. This means that—if the laser pulse is transmitted, then reflected from a target 1 meter away—it is possible that the full energy (J) from the laser pulse will be reflected into the photoreceiver; but—if the laser pulse is transmitted, then reflected from a target 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the earth to the sun, 10× the number of seconds that have elapsed since Cleopatra was born, or the ratio of the luminous output from a phosphorescent watch dial, one hour in the dark, to the luminous output of the solar disk at noon.

In many cases of lidar systems highly-sensitive photoreceivers are used to increase the system sensitivity to reduce the amount of laser pulse energy that is needed to reach poorly reflective targets at the longest distances required, and to maintain eyesafe operation. Some variants of these detectors include those that incorporate photodiodes, and/or offer gain internal to the detector, such as avalanche photodiodes (APDs) or single-photon avalanche detectors (SPADs). These variants can be configured as single-element detectors, segmented-detectors, linear detector arrays, or area detector arrays. Using highly sensitive detectors such as APDs or SPADs reduces the amount of laser pulse energy required for long-distance ranging to poorly reflective targets in time-of-flight systems. The technological challenge of these photodetectors is that they must also be able to accommodate the incredibly large dynamic range of signal amplitudes. It is more common to use photodiodes rather than APDs or SPADs in coherent lidar systems because detectors with built-in gain are not as useful when coherent gain is available. In a coherent lidar system, increasing the strength of the optical local oscillator amplifies the strength of the component of the heterodyned signal from which phase and frequency differences are measured, without the need for gain internal to the detector.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal—changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy reduces the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—requires emitting 120,000 pulses [(20*10*60*10)=120,000)]. When update rates of 30 frames per second are required, such as is required for automotive lidar, roughly 3.6 million pulses per second must be generated and their returns captured.

There are many ways to combine and configure the elements of the lidar system including considerations for the laser pulse energy, beam divergence, detector array size and array format (single element, linear, 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For example—compared to the 3D lidar above—to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eyesafe.

As noted above, while many time-of-flight lidar system operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a closer-by object can be recorded, as well as the range and intensity of later reflection(s) of that pulse—one(s) that moved past the closer-by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the distance between the target and lidar transmitter/receiver, the size of the target, and the orientation of the target. Laser returns from close, highly-reflective objects, are many orders of magnitude greater in intensity than the intensity of returns from distant or poorly reflective targets. Many lidar systems require highly sensitive photodetectors, for example APDs, which along with their CMOS amplification circuits may be damaged by very intense laser pulse returns.

For example, if an automobile equipped with a front-end lidar system were to pull up behind another car at a stoplight, the reflection off of the license plate may be significant—perhaps 10^12 higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors.

However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

Disclosure Material

FIG. 1 shows an example photo sensor 100 having a colloidal quantum dot (CQD) structure providing a photodiode 102 in accordance with example embodiments of the disclosure. In the illustrated embodiment, circuitry 104 for an integrated circuit, such as a readout integrated circuit (ROIC), is formed in or on a substrate 106. In embodiments, CMOS technology is used to form the circuitry.

In embodiments, the CQD photodiode 102 includes an anode 110 coupled to the circuitry 104, a photon absorber layer 108 comprising quantum dot layers, as described more fully below, a hole barrier 112, a transparent top electrode (cathode) 114, and an encapsulating material 116 over the cathode 114. An electron barrier 118 can be provided at the bottom of the absorber layer 108. A pixel input 120 can connect the anode 110 of the photodiode and the ROIC circuitry 104.

In example embodiments, a photodiode array can be fabricated directly on the surface of a ROIC in contrast to conventional sensors in which discretely fabricated arrays and circuit layers are connected together by flip-chip bonding or other means.

Figure 2:
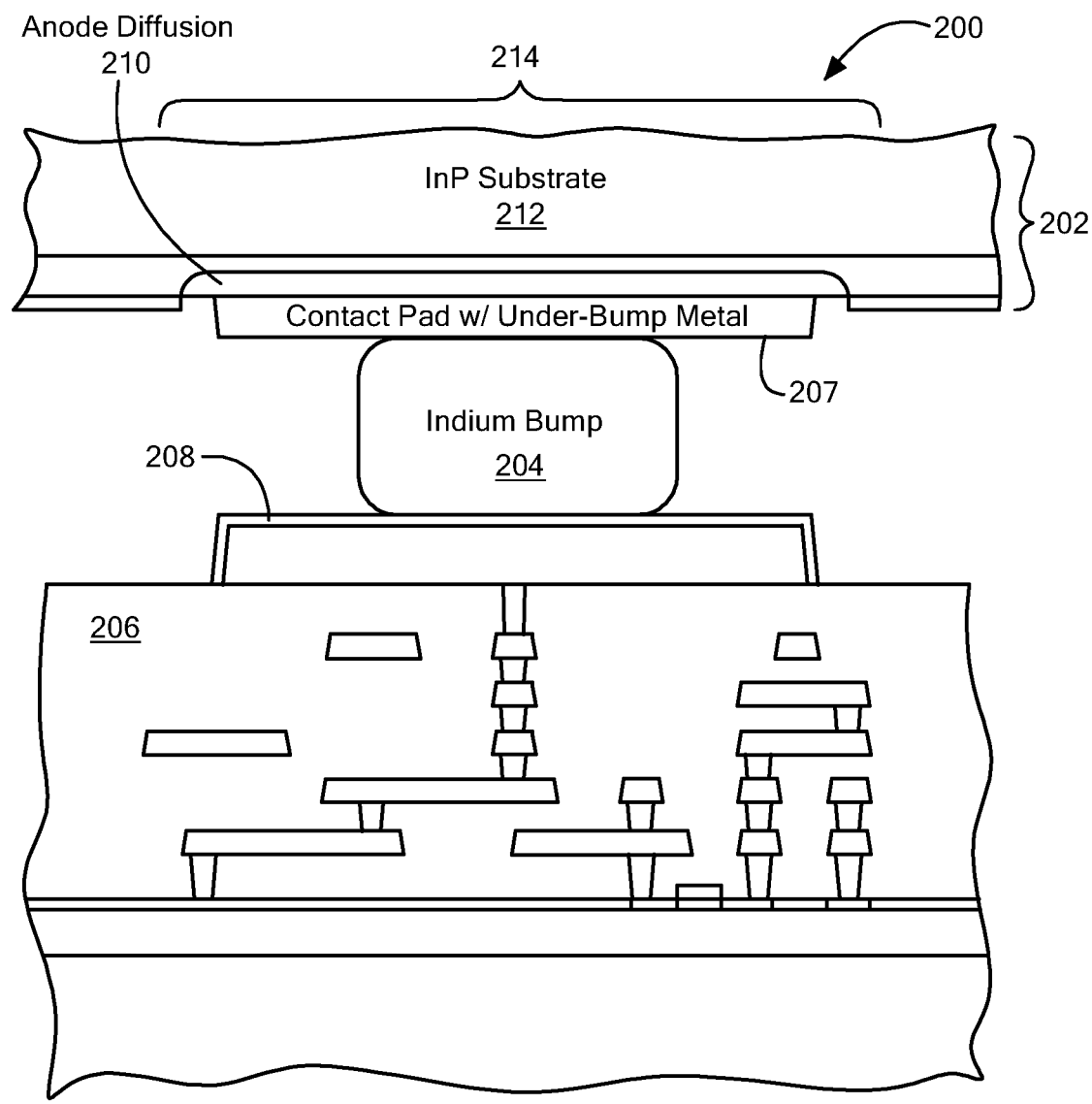
FIG. 2 is a cross-sectional view of a prior art sensor having a photodiode separately fabricated from a readout circuit and bumped together.

FIG. 2 shows a portion of a prior art focal plane array (FPA) 200, in which the separately fabricated detector array 202 is hybridized via indium bump bonding 204 to a read out integrated circuit (ROIC) 206. That is, a ROIC die 206 is fabricated separately from a detector die 202 and the two dice are interconnected via indium solder bumps 204. This arrangement requires contact pads 207, 208 with under-bump metal to provide contact with the solder bump 204. The detector contact pad 207 is connected to the anode of a conventional photodiode pixel 214, which is formed in an epitaxially grown thin film on a lattice-matched substrate 212. The ROIC contact pad 208 is connected to the input terminal of one channel of the ROIC. Not shown are other bump interconnects between other photodiode pixel anodes and corresponding ROIC channels, as well as at least one indium bump interconnect between a detector bias pad on the ROIC and the detector cathode layer, which is common to all pixels. Thus, the detector 202 and ROIC 206 are fabricated separately and bumped together in separate processing steps.

Figure 3:
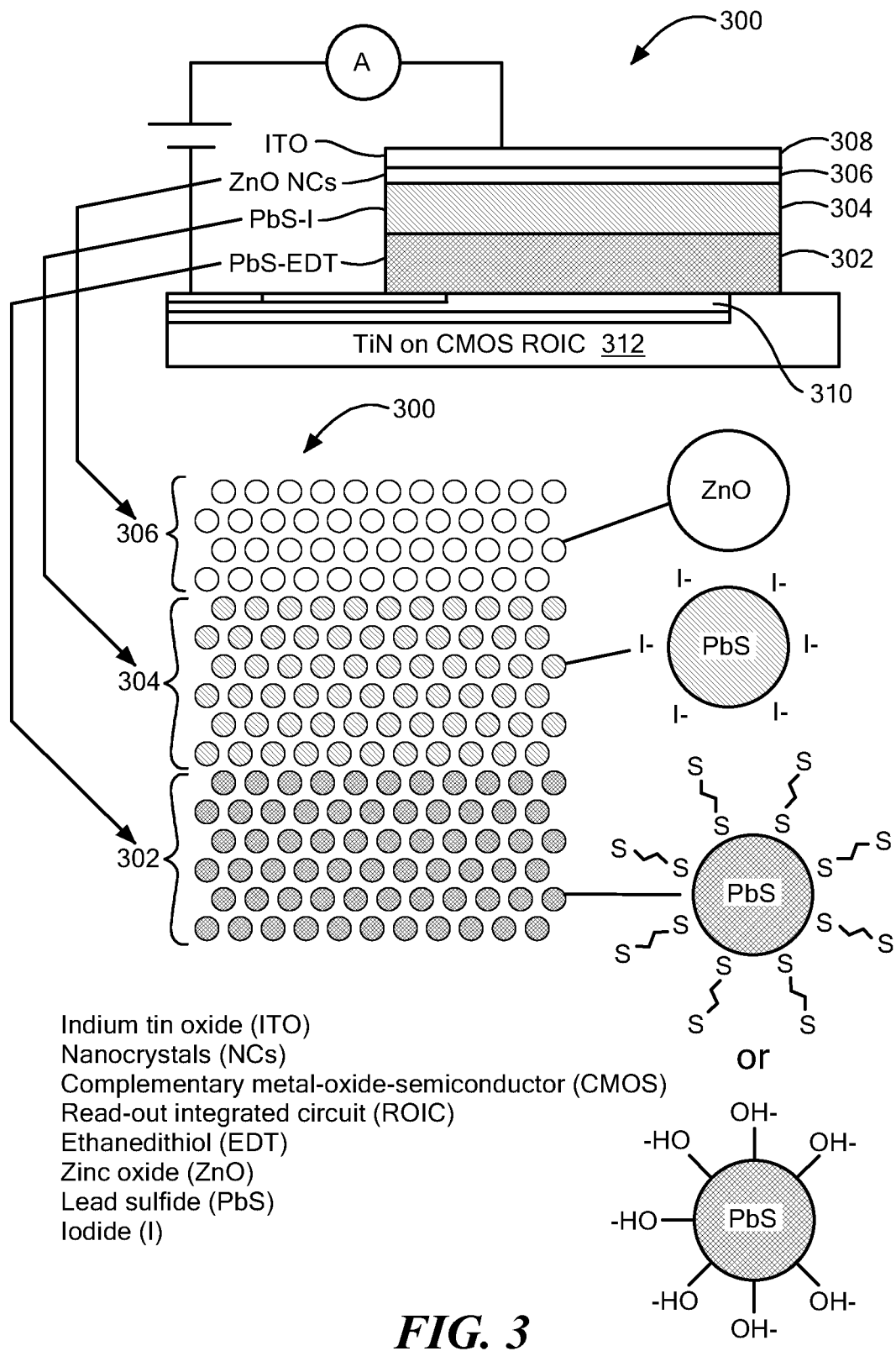
FIG. 3 is a representation of a portion of a photosensor having an example CQD photodiode structure with reverse biasing.

FIG. 3 shows an example CQD photodiode embodiment 300 in accordance with example embodiments of the disclosure. An example layer stack comprises a bottom metal anode 310, such as TiN, on a substrate 312, which may be a CMOS ROIC, a first layer 302 having a first material with a first dopant material, a second layer 304 having a second material with a second dopant material, and a third layer 306. A transparent cathode 308, such as a transparent conductive oxide (TCO), is deposited on the third layer 306. The photodiode 300 can be reverse-biased, as shown. While example embodiments are shown and described in conjunction with CMOS technology, it is understood that any suitable technology can be used.

In the illustrated embodiment, the first layer 302 comprises a p-type CQD layer, shown as lead sulfide (PbS), the second layer 304 comprises an n-type CQD layer, shown as PbS, and the third layer 306 comprises zinc oxide (ZnO). The TCO cathode 308 comprises indium-tin-oxide (ITO). A TiN metal anode 310 layer can be embedded in surrounding oxide.

In embodiments, the lead sulfide and zinc oxide layers comprise nanocrystal colloidal quantum dots packed into a solid film after deposition by solution processes. N- and p-type doping in the quantum dot layer is achieved by changing the chemical composition of the quantum dot surface before or after deposition. For example, the first layer 302 can comprise PbS CQDs treated with ethanedithiol (EDT) (PbS-EDT) or a hydroxide solution (PbS—OH), the second layer 304 can comprise PbS CQDs treated with an iodide salt (PbS—I), and the third layer 306 can comprise ZnO nanocrystals (ZnO NCs). Additional CQD embodiments are described below.

In another embodiment, a first p-type layer may comprise PbS-EDT deposited on a metal anode, which can comprise TiN, a second layer may comprise ZnO NCs, and a top transparent cathode can comprise ITO, fluoride-doped tin oxide (FTO), or aluminum-doped zinc oxide (AZO).

Figure 4:
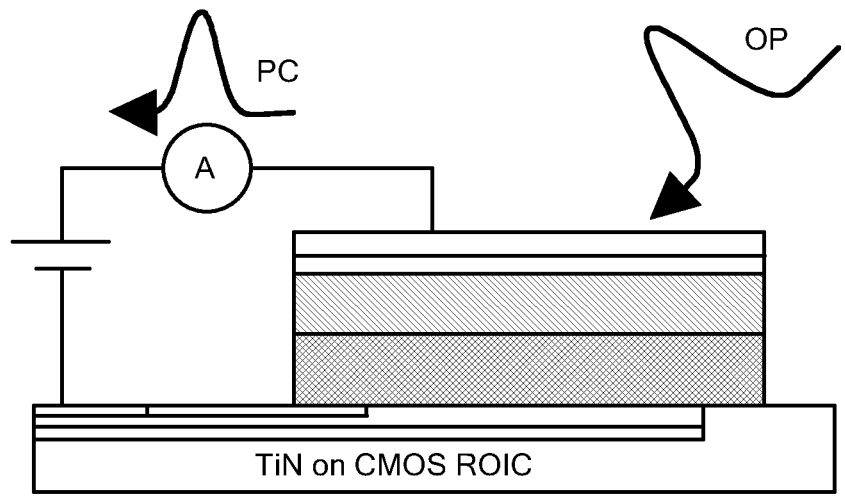
FIG. 4 shows an example CQD photodiode receiving an optical pulse and generating a current pulse.
Figure 5:
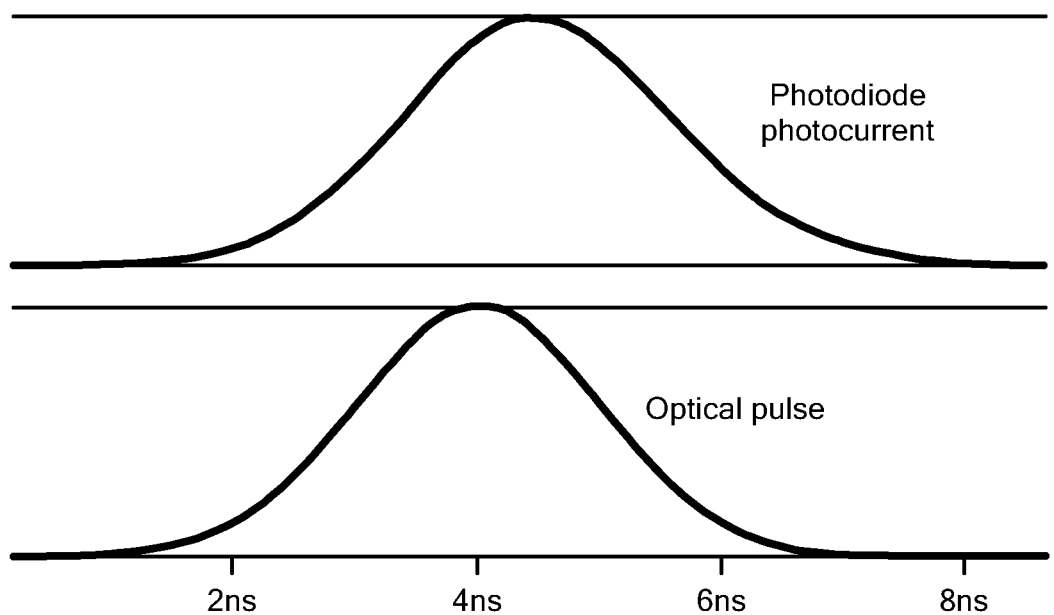
FIG. 5 is a waveform diagram showing the optical pulse and current pulse for the photodiode of FIG. 4.

FIG. 4 shows an example CQD-based detector 400, such as the detector of FIG. 3, receiving an optical pulse OP, an example waveform for which is shown in FIG. 5. The received pulse causes the photodiode in the detector to generate a photodiode current PC, as shown in FIG. 5, which can be amplified by an amplifier A.

In embodiments, a LIDAR sensor can comprise a CQD detector for time of flight (TOF) pulse return measurements. For example, the received optical pulse OP can comprise a pulse reflected by a target and returning to a time-of-flight lidar sensor after having been transmitted at a given time. In embodiments, a LIDAR sensor can comprise a CQD detector for measurement of two interfering coherent optical signals, as part of a coherent lidar system. For example, the received optical pulse OP can comprise the waveform of the component of a heterodyned signal from which phase and frequency differences are measured.

It is understood that the CQD layers can be configured to meet the needs of a particular application. For example, layer thicknesses can be selected to optimize absorption of infrared light, collection of photogenerated charge carriers, response speed, and the like.

Figure 6:
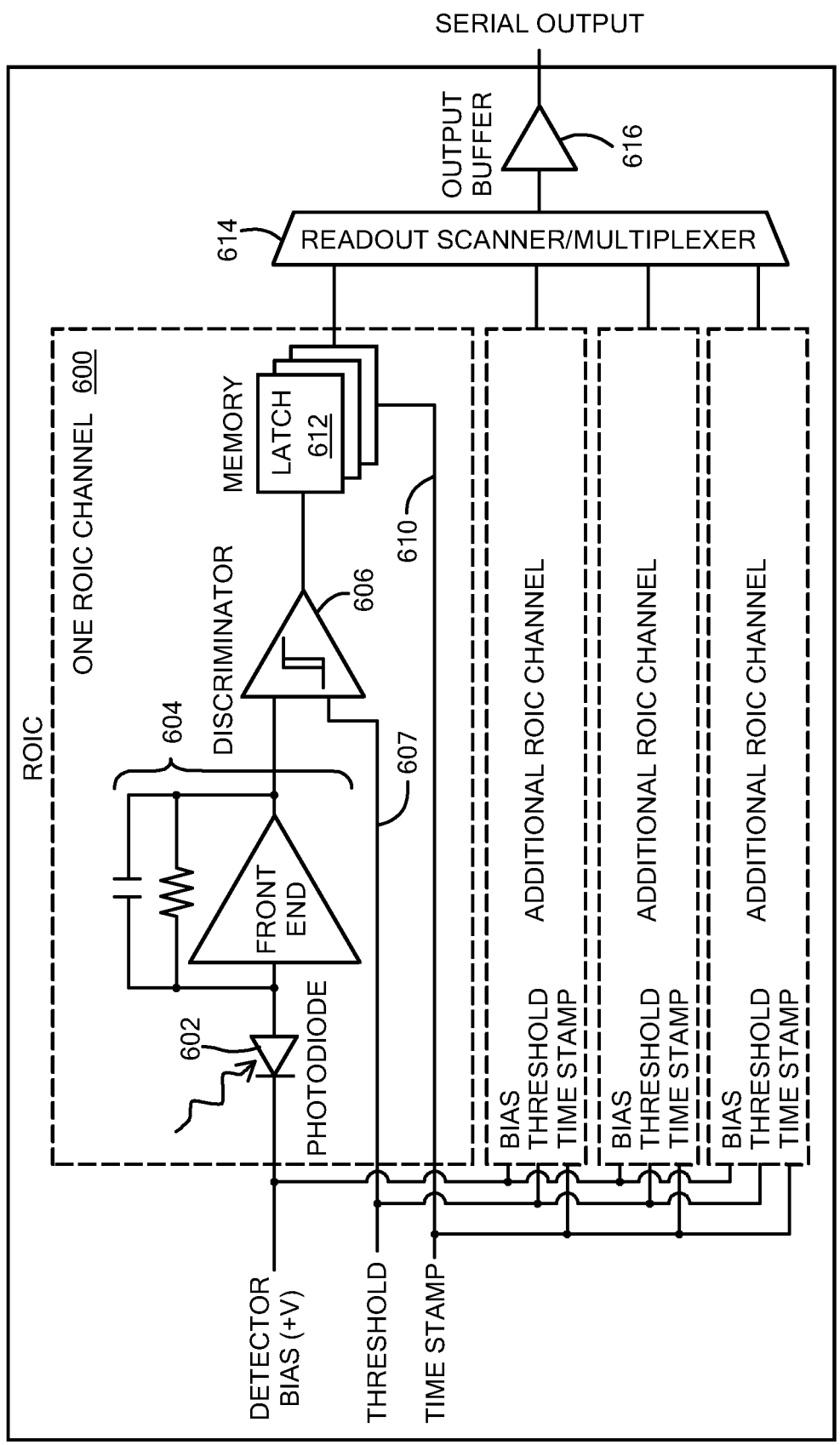
FIG. 6 is a block diagram of an example time of flight sensor having a CQD photodiode array.

FIG. 6 shows one channel, or pixel, of an example LIDAR time of flight sensor 600 having CQD photodetectors in accordance with example embodiments of the disclosure. The sensor channel 600 can include a CQD photodiode pixel 602 to detect optical pulses reflected from a target illuminated with transmitted energy. The front end circuit 604 of the sensor channel, which may include a transimpedance amplifier for example, generates an amplified voltage pulse from a current pulse generated by the photodiode pixel 602 in response to an optical pulse incident on the photodiode pixel 602. A discriminator circuit 606 of the sensor channel, such as a threshold comparator, can determine if the voltage waveform generated by the front end circuit 604 rises or falls through one or more threshold levels that have been selected to limit false-positive detection events in which circuit noise is mistaken for arrival of a reflected signal pulse. The discriminator circuit 606 may, for example, generate a voltage pulse when the waveform from the front end circuit 604 rises through a specified threshold level 607, triggering storage of a time stamp 610 from which the distance between sensor and target can be calculated based on the time-of-flight and the speed of light. The time stamp 610 may be a digital number or analog voltage generated by a return timer circuit which may be remote. A memory 612 in the sensor channel can temporarily store signal information, such as time of flight, time over threshold, and the like, when triggered by the discriminator circuit 606. Subsequently, a readout circuit 614, shared among all channels of the sensor, can multiplex stored signal information from the plurality of sensor channels to a limited number of readout channels for serialized output through a buffer amplifier 616 to an external circuit of which the sensor is a component.

Figure 7:
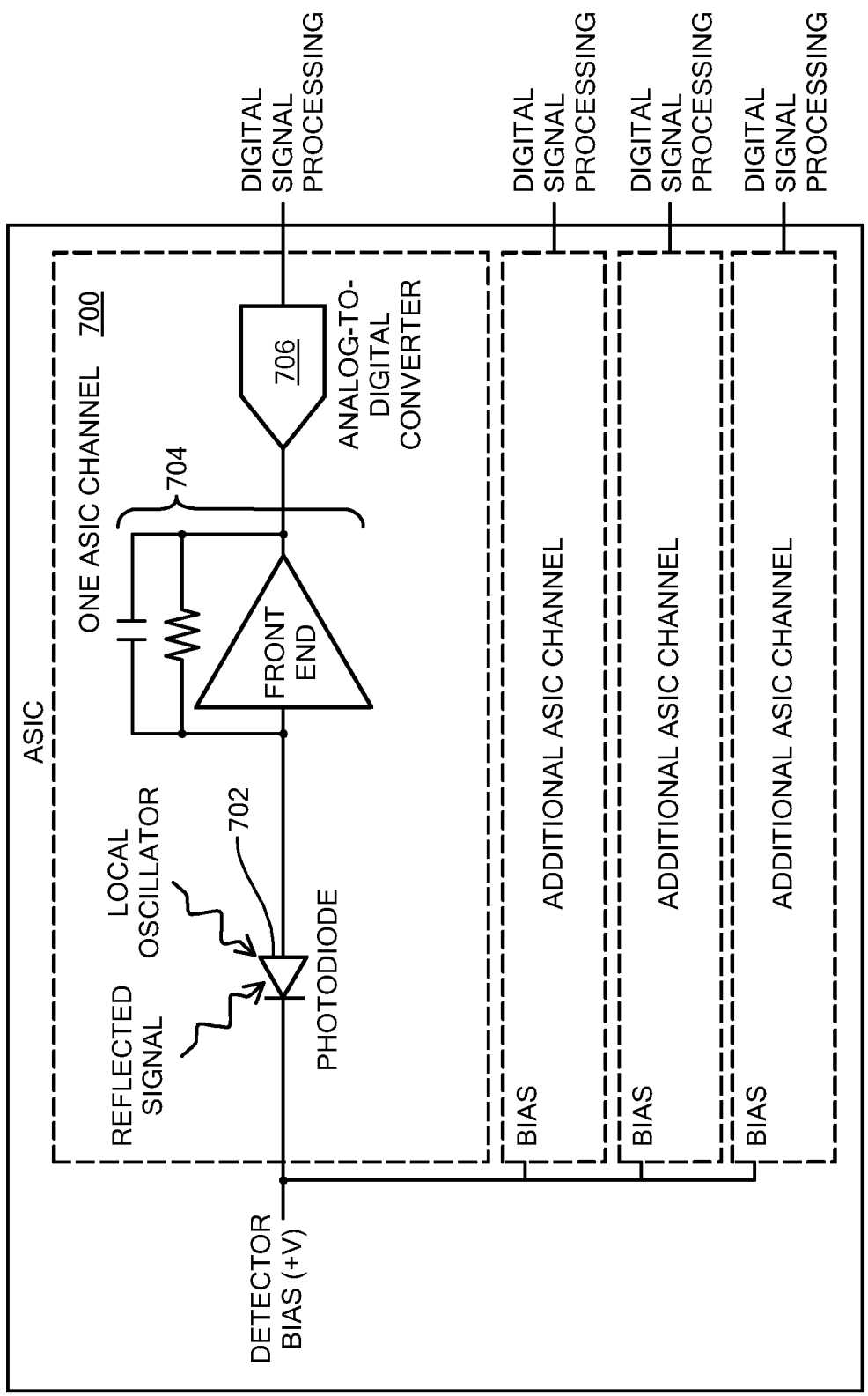
FIG. 7 is a block diagram of an example sensor for FM lidar having a CQD photodiode array.

FIG. 7 shows one channel, or pixel, of an example coherent LIDAR sensor 700 having CQD photodetectors in accordance with example embodiments of the disclosure. The sensor channel 700 can include a CQD photodiode 702 to detect the optical waveform produced by coherent mixing of an optical local oscillator with the signal reflected by a target illuminated with transmitted energy. The front end circuit 704 of the sensor channel, which may include a transimpedance amplifier for example, generates an amplified voltage waveform from the current waveform generated by the photodiode pixel 702 in response to the coherently mixed optical waveform incident on the photodiode pixel 702. The sensor channel can include an analog-to-digital converter 706 which rapidly digitizes the voltage waveform generated by the front end circuit 704 and streams the digitized waveform to a digital signal processor which may be remote. In example embodiments, measuring the amplitude of the voltage waveform over multiple periods of the interference signal, the difference frequency between local oscillator and reflected signal, and therefore the target distance, can be determined in a frequency-modulated coherent lidar system. In example embodiments this measurement can be performed using a fast Fourier transform implemented in the digital signal processor.

Figure 8:
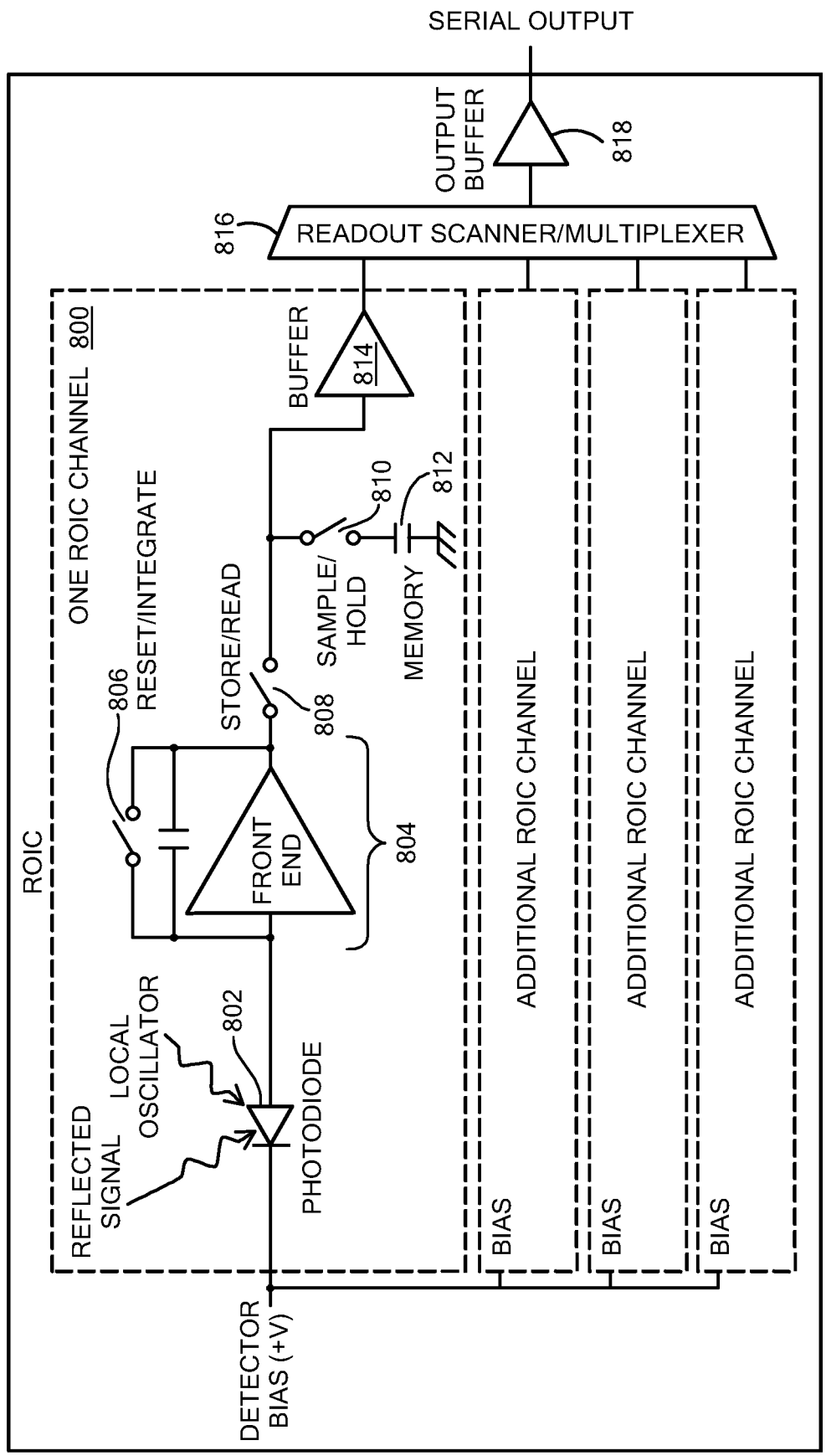
FIG. 8 is a block diagram of an example sensor for holographic lidar having a CQD photodiode array.
Figure 9:
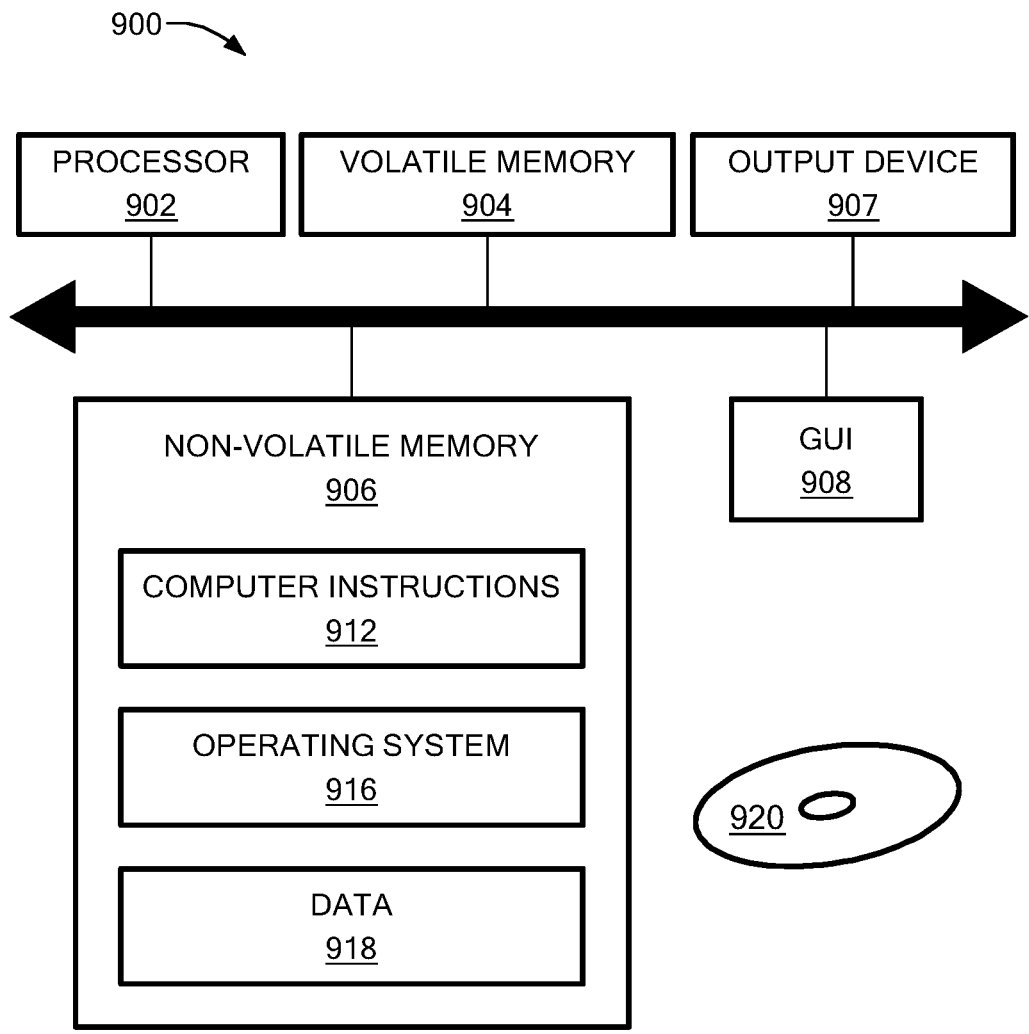
FIG. 9 is a schematic representation of an example computer than can perform at least some of the processing described herein.

FIG. 8 shows one channel, or pixel, of an example coherent LIDAR sensor 800 having CQD photodetectors in accordance with example embodiments of the disclosure. The sensor channel 800 can include a CQD photodiode 802 to detect the optical signal produced by coherent mixing of an optical local oscillator with the signal reflected by a target illuminated with transmitted energy. The front end circuit 804 of the sensor channel, which may include a capacitive transimpedance amplifier (CTIA) for example, generates an amplified voltage that is proportional to the total amount of charge delivered by the photodiode pixel 802 during a signal integration period. The signal integration period is determined by operation of a reset/integrate switch 806, a store/read switch 808, and a sample/hold switch 810. Prior to signal integration, reset/integrate switch 806 is closed, discharging the feedback capacitor of the front end circuit 804, the store/read switch 808 and sample/hold switch 810 are closed, forcing the voltage stored across memory capacitor 812 to the reset condition. Signal integration starts when reset/integrate switch 806 is opened. Current from photodiode 802 charges the feedback capacitor of the front end circuit 804, developing a voltage at the output of the front end circuit which is sampled by memory capacitor 812. At the end of signal integration, sample/hold switch 810 is opened to isolate memory capacitor 812, thereby storing the voltage that encodes the total amount of charge delivered by the photodiode pixel 802 during the signal integration period. Subsequently, a readout circuit 816, shared among all channels of the sensor, can multiplex stored signal information from the plurality of sensor channels to a limited number of readout channels for serialized output through a buffer amplifier 818 to an external circuit of which the sensor is a component. During readout, the store/read switch 808 is opened to isolate the readout signal path from the front end circuit 804 and the sample/hold switch 810 is closed so that the voltage stored on memory capacitor 812 can be passed through the channel's buffer amplifier 814 to the readout circuit 816 and then to the serial output buffer amplifier 818. In example embodiments, images of spatial interferograms collected in this manner are used to compute a three-dimensional image of the target.

It is understood that CQD processing, structures, and materials, can vary to meet the needs of a particular application. U.S. Pat. No. 9,941,433, which is incorporated herein by reference, discloses example CQD configurations. A colloidal quantum dot-based photodetector can be formed by a layer-by-layer deposition process to build a film on a substrate, such as by alternatively dipping the substrate into a colloidal solution containing at least one type of a quantum dot or spin-coating the solution onto the substrate, thereby forming a monolayer of quantum dots and then dipping the substrate with monolayer of quantum dots in a ligand spacing solution to build a lattice of the quantum dots. Then, alternatively exposing the lattice of the quantum dots to a water vapor and an infill materials leaves behind an inorganic material, wherein exposing the film to the water vapor coats the lattice's accessible surfaces providing reactive oxygen-containing chemical moieties and then exposing the lattice to the inorganic matrix material precursor penetrates pores of the lattice and reacts with accessible surfaces to form an inorganic matrix, thereby forming the photodetector film and isolating quantum dots from atmospheric exposure. The infilling process is typically performed within a reactor, wherein the accessible surfaces are exposed to a vapor or gas providing reactants to form the infill material. The excess precursor and volatile byproducts are purged via vacuum driven evaporation or chemical cleaning processes. The adsorbed layer of the first precursor reacts with the infill material, which can be organic or inorganic, where the reaction leaves behind the inorganic matrix material. The volatile byproducts and excess of the second precursor are likewise purged from the reactor to complete the process.

The process can be repeated to build the photodetector film using the same quantum-dot type, inorganic matrix material different materials, and combinations thereof. For instance, the colloidal solution can contain one or many quantum-dot types or the infill material can be changed. On repeated process the quantum-dot type or types, the inorganic-material, or combinations thereof can be changed to create different homogenous or heterogonous layers, thereby creating junctions with the photodetector film, including semiconductor heterojunctions and heterostructured devices including p+/n, p-i-n, n-B-n, and other such structures.

The quantum-dots may comprise nanometer-sized particles with quantum confinement in all dimensions with energy band structure discrete at atomic-like levels. As such the quantum-dot resembles an artificial tunable atom with electronic energies controlled by quantum-dot materials, shape, dimensions and material configuration. The extremely small size of the quantum-dots make "quantum confinement" effects dominate their electro-optical (EO) properties. When the quantum-dots diameter is smaller than the Bohr radius of an electron-hole pair, or exciton, created by photon absorption, the quantum-dot's energy density of states is discrete. The lowest energy optical transition increases as the particle size is reduced. Reduced quantum-dot size causes a blue-shift in the absorption and emission spectra. The greater the confinement, the shorter the wavelength of the electron, and the "bluer" the optical spectrum of the quantum-dot. The quantum-dots material type can include InSb, InGaP, PbS, PbSe, PbTe, $PbI_2$, HgS, HgTe, $LaF_3$, CdS, $CuInS_2$, $CuZnInS_2$, CdSe, CIS, CZTS, YV(B)$O_4$, ZnS, ZrO2, including core, core-shell and core-shell-ligand architectures.

The quantum-dots may be solution processed to allow convenient deposition onto the substrate. The fluidic processed quantum-dot's electro-optical properties are determined by their size, shape, and composition. A quantum-dot can have a core, a shell, and ligand coating. The core can be configured to be atomically homogenous or an alloy, tunable by size and shape. The shell, also referred to in the art as a coating, can also be configured to be atomically homogenous or as an alloy, with shape approximately conforming to the core, dependent on the shell size or thickness. The shell can be tuned in relation to the core to modify electrical, optical, and electro-optical characteristics of the quantum-dot and chemical affinity to ligand coating. The ligand coating may comprise an organic or inorganic material that coats the outside of the nanoparticle again, altering the electrical, chemical, and optical characteristics of the quantum-dot. The ligand coating may be organic preventing aggregation when colloidally dispersed, although it can be replaced by an inorganic ligand coating upon deposition. The ligand defines in part the spacing of the monolayer of quantum-dots. In aggregate, the combination of the core, the shell, and the ligand are tunable and thus the photodetector film has tunable properties including a tunable band gap based on composition of the quantum-dots and infill material, allowing sensitivity to optical radiation including ultraviolet, visible, infrared, x-ray, and gamma photons.

The quantum-dots have a large surface-to-volume ratio. For perspective, nanoscale particles have approximately million times more surface area than a cm-scale object detector with the same volume. The quantum-does surface area and density of trap sites plays a role in the optoelectronic properties of the detector system. The quantum dot's large surface area and high surface energy causes particles, including the surrounding quantum-dots, to agglomerate and oxidize, which results in unstable performance and very short detector lifetimes. Typically, the as-synthesized quantum-dots include a long chain organic molecule, such as oleic acid, to prevent agglomeration and preserve quantum confinement properties during synthesis, storage, and subsequent deposition onto the substrate and films.

To allow quantum tuning of electronic states in the photodetector film and promote transport of one or both carriers from the quantum-dot into the inorganic matrix, alloys of the quantum-dots can form type-II or quasi-type-II heterostructured quantum-dots. The type-II and quasi-type H heterostructured quantum-dots can form type-I or type-II heterostructures within the photodetector film. Delocalizing the hole and electron orbitals with consideration of the local dielectric environment the desired bandgap is achieved and the valence and conduction bands are aligned to allow transport of one carrier through the matrix and another carrier through dot-to-dot tunneling. To reduce carrier recombination, doping the quantum-dot or the infill material, optimizes bulk distributed heterostructure. Doping the quantum-dots and aligning the band structures, such that influence of the trap states can be controlled, allows high carrier lifetimes and large carrier mobilities.

Processing can include dipping the substrate into the ligand spacing solution, replacing long fatty ligands, such as oleic acid, with a shorter length molecular linker to reduce the inter quantum-dot spacing. Using short-chain molecular linkers, such as EDT, reduces the inter quantum-dot spacing, lowering inter quantum-dot energy barriers that govern charge tunneling and resulting in higher conductivity.

Using a layer-by-layer (lbl) deposition process, the long chain molecule capped as synthesized quantum-dots, is used to deposit the monolayer. The monolayer is "washed" with the ligand spacing solution containing the short chained organic or inorganic ligands replacing the "as synthesized" long-chain molecules by a short ligands, creating a highly uniform quantum-dot lattice with less internal stress.

The ligand spacing solution can include inorganic ligands that also passivate and dope the quantum-dots. The ligand spacing solution can include inorganic small molecules, including halides (I—, Br—, Cl—) and pseudohalides (N3-, OCN—, SCN—), metal-free chalcogenides, oxo- and amido species (S2-, HS—, Se2-, HSe—, Te2-, HTe—, TeS32-, OH—, NH2-), oxo- and polyoxo-metallates halometallates (such as CH3NH3PbI3), and chalcogenidometallates ($Sn_2S_6^{4-}$, $In_2Se_4^{2-}$, $Cu_7S_4^-$, or $AsS_3^{3-}$, etc). These inorganic ligands passivate surface sites on the quantum-dots and increase the carrier mobilities of the photodetector film reaching up to 50 cm2/(V s), within two orders of magnitude of bulk semiconductor values. This enhancement in charge transport originates from significantly reduced inter quantum-dot distance and lowered energetic barrier between adjacent quantum-dots.

The process allows superlattice films containing more than one type of the quantum-dots. For example, a layer of one type of composition of the quantum-dot can be deposited, "washed" with solvents and a ligand spacing solution, then a second layer of different type of the quantum-dots can be deposited. The monolayer compositions can change as the quantum-dot lattice is grown. Several layers of one type of the quantum-dots can be deposited until a desired thickness is achieved, and then multiple layers of a second type of the quantum-dot can be deposited to a desired thickness. Heterostructured films, including p+/n, p-i-n, and other structures can be made, contacted with metal electrodes and operated as photon detectors. These layers can have preferential carrier transport, achieved through doping.

After depositing one or more of the monolayers of the quantum-dots and accompanying ligand replacement, the inter quantum-dot spacing is infilled with the inorganic material to form the inorganic matrix. The inorganic material can be oxide or semiconductor material, filling the spaces within the lattice. The infill can create or further promote type-I or type-II band alignment of the quantum-dots. The electrical and dielectric properties of the infill material can be used to further tune the quantum-dot electronic states to form conduction and valence offsets favorable for preferential carrier extraction and transport. These offsets take into account the local nanoscale dielectric properties.

A nonlimiting list of the infill material includes chalcogenides ($As_2S_3$, PbS, PbSe), metal oxides ($Al_2O_3$ with trimethylammonium), methylammonium lead halides ($CH_3NH_3PbX_3$, where X is a halogen, such as iodine, bromine, or chlorine), with an optical bandgap between 1.5 and 2.3 eV depending on halide content; or formamidinium lead trihalide ($H_2NCHNH_2PbX_3$). Methylammonium lead halides and formamidinium lead trihalide allow charge transport in perovskites over long distances, with diffusion lengths of 1-2 µm at room temperature using solution-processing. The infill material leaves behind an inorganic material filling the lattice to form the inorganic matrix.

A large number of materials can be used to infill the lattice and form the inorganic matrix. Inorganic materials include oxides, sulfides, selenides, tellurides, nitrides, fluorides and some metals. Many classes of compounds are used as metal reactants. The metal reactants used in ALD can be roughly divided into two groups, inorganic and metal organic, and these can be further categorized into elements, halides, alkyls, cyclopentadienyls, alkoxides, b-diketonates, amides and imides, phosphines, silyls, and amidinates. Alkyls, which are organometallic reactants containing a direct metal-carbon bond, are generally very reactive, but stable alkyls are not available for many metals and the deposition temperatures are limited because of the decomposition of the reactants. Chlorides, which belong to the general class of halides, are reactive, stable at a broad temperature range and available for many metals, but the deposited films may suffer from chlorine residues and film thickness gradients in the direction of flow, formed by secondary reactions of the HCl released in the reactions. The variety in non-metal reactants is somewhat less than in metal reactants. The most commonly used types of non-metal reactants are the hydrides of the non-metal elements: water ($H_2O$), ammonia ($NH_3$—), and hydrogen sulphide ($H_2S$), to grow oxides, nitrides, and sulphides, respectively. The advantage of these types of reactants is their generally high stability and reactivity in a broad temperature range, including high temperatures.

Inorganic matrix infill materials can include oxides, sulfides fluorides or combinations thereof including $TiO_2$, $Al_2O_3$, MgO, $SiO_2$, $ZrO_2$, $Al_xZr_yO_z$, $In_2O_3$, $HfO_2$, ZnS, CaS, BaS, CdS, PbS, IN2S3, CuS, WS2, TiS2, Sb2S3, SnS, GaSx, GeS, MoS2, Li2S, Bi2S3, As2S3, ZnF, $LaF_3$. In sulfide growth, thiol ligands provide a reactive starting surface, analogous to hydroxyls in oxide ALD. The overall reaction can be written as $ML_x+(x/2)H_2S \rightarrow MS_{x/2}+xHL$, where $ML_x$ is the precursor of metal M with x ligands L.

The inorganic matrix acts isolates the quantum-dots from atmosphere suppressing oxidative and photo-thermal degradation. The process both negates the oxidation instability that is otherwise inherent quantum-dot based photodetectors and enhances the optoelectronic properties of the quantum dots. The inorganic matrix is the only component of the resulting composite that is accessible to the atmosphere. Because it is stable with respect to oxidation, the composite as a whole is stable with respect to oxidation.

In order to compliment the quantum dots with which it is paired, there are several constraints that the matrix material must satisfy to preserve confinement of both hole and electron orbitals and have suitable use as a photodetector film. It must have a wide band gap so that it does not absorb light in the region of interest. It must not have energy levels within the band gap of the quantum dots, so that it does not create trap states. It must have a vapor phase that can penetrate the quantum dot film at low temperatures, so as to allow for infilling without destroying the quantum dots. Finally, it must be stable and unaffected by oxygen exposure, so that it can protect the quantum dots from their environment.

Once the quantum-dot films have been encased in a suitable inorganic matrix, they are stable with respect to oxidation over period of years. The detectors subsequently made from these films exhibit steady, reproducible optoelectronic characteristics. Engineering the film must take into account the particular application and coulomb interactions between charges on the quantum-dots within the lattice.

Long-range coulomb interactions between charges on the quantum-dots slow the dynamics of injected electrons, an effect described by an electron (coulomb) glass model. To increase the electrical current through the photodetector film, the tunneling of electrons between quantum-dots must be enhanced, such as by decreasing the inter quantum-dot distance and height of the tunnel barriers between quantum-dots in the array. As inter quantum-dot distances are reduced using short inorganic ligands, changes in transport properties result from decreased separation and chemical transformation of the surface. As packing of the quantum-dots increases, the density of trap states can increase, preventing carriers in the photodetector films from obtaining the long carrier lifetimes required for high-performance detector operation. Instead of only considering the inter quantum-dot spacing, the applicants realize tuning the photodetector composition, the organic or inorganic ligand shells used to coat them, and the electrical properties of the infill materials enhance both hole and electron mobilities and lifetimes.

Doping generally refers to the large variety of techniques to perturb and control carrier concentrations in the photodetector films. The preservation of nanocrystal size and film morphology during these doping treatments ensures that the optical and transport properties are largely maintained.

The electronic states of a semiconductor can be characterized as either being donor or acceptor in nature. Donor states are electrostatically neutral when occupied by an electron and positively charged when empty [D(+/0)], while conversely, acceptor states are neutral when empty and negatively charged when occupied [A(0/−)]. Carrier concentrations and majority carrier type emerge from the requirement to balance all of the ionized donor and acceptor states within the system. At thermal equilibrium, a given donor/acceptor has an ionization probability determined by the Fermi-Dirac distribution. Thermal excitation of valence electrons over the energy barrier of the bandgap results in an intrinsic carrier concentration. The intrinsic carrier concentration specifies the balance, without external excitation, between electrons and holes via the law of mass action. This relationship also holds for nondegenerate extrinsically doped semiconductors, as any donor/acceptor states must also be in thermal equilibrium. Defect states can shift the balance of electrons and holes, but never change the p-n product in the nondegenerate regime. Defects can give rise to ionized dopant states. Native space charge can be compensated by doping comparable amounts of immobile charge of opposite polarity.

In heterovalent doping, impurities in a different valence state than the host cations are intentionally incorporated to provide either extra electrons (n-type) or extra holes (p-type). These carriers can introduce extrinsic conductivity to an otherwise poorly conducting material. The quantum dots can be doped n-type and p-type through the use of indium, tin, aluminum, silver, or other noble metal. In a nucleation-doping approach, the dopant and host precursors are mixed during the nucleation step. The reaction conditions and precursor reactivities are tuned so that the dopants nucleate first. The nuclei are then overcoated with a shell of the host material creating a core (dopant)/shell structure with a sharp or graded interface depending on the shell growth temperature. In the growth-doping approaches are available where a dopant precursors is added to quantum-dot to adsorb dopants at the quantum-dot surfaces. The dopant ions are then encapsulated by overgrowing an isocrystalline or heterocrystalline shell. A balance of reactivity is achieved when the dopant atoms remain on the quantum-dot's surface for a long enough time to undergo a precipitation reaction and to become "trapped" by host overgrowth.

One way to balance host and dopant precursor reactivity is to choose the appropriate coordinating ligand to the metal cations depending on the intrinsic reactivity dictated by their relative Lewis acidity. These considerations relate directly to the thermodynamic stability of metal-ligand bonds, but they have implications also for kinetic reactivity (i.e., rates of precipitation reactions). This connection can be appreciated by remembering that transition state theory can be used to predict changes in energetic reaction barriers due to variations in the free energy of the reactants. In some cases rather different Lewis acidities can be overcome without requiring different coordinating ligands on the host and dopant precursors.

The quantum-dots have high surface area to volume ratios, exposing a myriad of surface defects that can produce midgap defect states. Strong affinity between cations and nucleophilic ligands during synthesis leads to quantum-dots with nonstoichiometric cores that are charge balanced by a ligand shell. Despite being nonstoichiometric, natively synthesized quantum-dots are not heavily doped because the excess charge of the surface cations is compensated by their binding ligands. Synthetically modifying the stoichiometry of nanocrystals is often difficult, as changing precursor concentrations can result in different sized particles instead of stoichiometric variations.

Doping of the effective medium originates from nonstoichiometry, ligands and unpassivated surface sites, which shift the balance of space charge within the film and generate free carriers. Simultaneously, many of the free carriers are likely localized to traps of similar chemical origin, possibly due to self-compensation, and the Fermi level is often pinned. Despite this, a broad range of electrochemical potential shifts can be induced in native films through methods based on stoichiometric control, metal ion incorporation, and electrochemical charging.

When native ligands are removed as part of a ligand exchange, a variety of midgap states can form and cause doping or carrier trapping depending on their depth and donor/acceptor type. In addition to exposing unpassivated surface sites, the choice of ligand also crucially determines the protection of surfaces from oxidation. Ligands can also play an active role in doping the photodetector films, either through modulating defect depths and densities, or through acting as charge donors themselves.

Since nonstoichiometry and charge balance are often the origin of native doping in nanocrystal films, using postsynthetic techniques to control the stoichiometry of a film is a logical tactic to control its doping. The overall doping effect of a given treatment can be understood by considering the average charge balance of all the atomic and molecular constituents of a film.

Doping through ion diffusion is growth doping where the dopants are introduced in a preformed quantum-dot through diffusion. Cation exchange reactions, in which the cation of an ionic solid can be exchanged with a different cation, have been widely employed in semiconductor quantum-dot. In bulk semiconductor material the phenomenon can require weeks and require elevated temperature, the exchange in the quantum-dots can be done within seconds and at room temperature. The extent of the cation exchange reactions can be controlled by changing the solution concentration of incoming cations or the ligands that coordinate the ions in solution to modulate the contribution of ion solvation in the overall energetic balance of the reaction. In the nanosize regime "surface adsorption" of dopant ions can be followed by "lattice incorporation" above a certain critical temperature, also "lattice diffusion" and eventually "lattice ejection" of the dopants can occur upon thermal treatment.

Chemical redox agents, solubilized molecular species with known reduction potentials, can efficiently inject charge into the photodetector film. These approaches result in high doping densities as the reactions are only stoichiometrically or kinetically restrained.

Films can be made using organic or inorganic ligands with additional inorganic coating or infill materials, and these detector films may exhibit the oxidation instability mentioned earlier. However, this instability is substantially reduced using low-temperature vapor deposition of an inorganic matrix. Such a process infills the pores of the quantum-dot solid films with the inorganic matrix. In the mean field approximation, the average dielectric constant of the medium around each quantum-dot, $\epsilon_m$, can be estimated as the volume-weighted average of dielectric constants for the organic spacer and for the quantum-dot. With tighter packing, the mean dielectric constant increases due to the increasing volume fraction of inorganic particles. With infilling, the dielectric value is a volume-weighted average of the quantum-dots and the infill inorganic material. The infill material's dielectric causes a corresponding modification in electronic states within the quantum-dot, due to selective delocalization of the hole and electron orbitals. As a result, when choosing the quantum-dot size, matrix material dielectric properties must be considered. For example, if a wide bandgap metal oxide infill is used, the electron and hole orbitals can be confined by the wide bandgap infill material. If a narrow bandgap semiconductor infill is used, the electron and hole orbitals can be localized or delocalized based on the properties of the infill.

Either or both carriers can transport through the films tunneling dot-to-dot. If a semiconductor infill is used with electrical states aligned with the density of states of the valence or conduction bands of the quantum-dots, the hole or electron, respectively, can be injected into the infill material and can be transported through the infill semiconductor material.

A variety of composite photodetectors can be manufactured such as pn and pin. In addition xBy devices can be made where x and y are either n-type of p-type materials and B is a barrier layer. The photodetector film can be tailored to provide local quantum-dot to quantum-dot distributed nano-hetereostructures for efficient transport of one carrier, for example the minority carrier, through the inorganic matrix's higher conductivity pathways and allow the other carrier to transport by quantum-dot to quantum-dot hopping. The photodetectors can be single pixel or pixelated. The pixelated photodetectors can have pixel areas defined by electrode spacing or by dielectric barriers.

FIG. 7 shows an exemplary computer 700 that can perform at least part of the processing described herein. For example, the computer 700 can perform processing to process signal return and determine time of flight information, as described above. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A LIDAR sensor, comprising:
a photodetector array having one or more photodetectors comprising colloidal quantum dots (CQDs), wherein the photodetector array is responsive to light transmitted at a known time and received by the photodetector array after reflection from a target for determining a distance from the target to the sensor, or to light with an interference pattern in time and space produced by coherent mixing of light reflected from a target with light from an optical local oscillator for determining a distance from the target to the sensor based on phase or frequency relationships extracted from the interference pattern; and
an integrated circuit, wherein the photodetector array is formed on the integrated circuit, wherein the photodetector comprises a photodiode including a depletion region between a weakly p-doped layer and a heavily doped n-type transparent conductive oxide.

2. The sensor according to claim 1, wherein the sensor includes a laser transmitter configured to transmit the light at a known time.

3. The sensor according to claim 1, wherein the sensor includes a laser transmitter configured to vary the frequency of the transmitted light over time such that the laser frequency at any given time is known.

4. The sensor according to claim 1, wherein the sensor includes a laser transmitter and an optical local oscillator, where the laser transmitter is configured to transmit light to a remote target with a known phase relationship at the time of transmission to the light of the optical local oscillator, and the laser and optical local oscillator are the same light source.

5. The sensor according to claim 1, wherein the sensor includes a laser transmitter and an optical local oscillator, where the laser transmitter is configured to transmit light to a remote target with a known phase relationship at the time of transmission to the light of the optical local oscillator, and the laser and optical local oscillator are different light sources.

6. The sensor according to claim 2, further including a signal processing circuit to determine the distance from the sensor to the target.

7. The sensor according to claim 3, further including a signal processing circuit to determine the distance from the sensor to the target or the relative velocity between sensor and target.

8. The sensor according to claim 1, wherein the sensor includes a laser transmitter and an optical local oscillator, where the laser transmitter is configured to transmit light to a remote target with a known phase relationship at the time of transmission to the light of the optical local oscillator, and further including a signal processing circuit to reconstruct a three-dimensional image of the target from an interferogram produced by coherent mixing of the reflected laser light with light from the optical local oscillator.

9. The sensor according to claim 1, wherein the integrated circuit comprises a readout integrated circuit (ROIC).

10. The sensor according to claim 9, wherein the ROIC comprises CMOS circuitry.

11. The sensor according to claim 1, wherein the photodetector array forms part of a focal plane array (FPA).

12. The sensor according to claim 1, wherein the photodetectors comprise photodiodes having an anode, a p-type layer, an n-type layer, and a cathode.

13. The sensor according to claim 12, wherein the CQD structure comprises a doped p-type layer, an n-type doped layer, and an electron-selective (hole-blocking) layer.

14. The sensor according to claim 13, wherein in the doped p-type layer and the n-type doped layer comprise lead sulfide CQDs.

15. The sensor according to claim 14, wherein the electron-selective (hole-blocking layer comprises zinc oxide, C60 fullerenes, or phenyl-C61-butyric acid methyl ester (PCBM).

16. The sensor according to claim 15, wherein the lead sulfide doped p-type and the n-type doped layers and the zinc oxide layer comprise nanocrystal colloidal quantum dots packed in a film.

17. The sensor according to claim 1, wherein the photodetector includes a photodiode having a depletion region between weakly p- and n-doped layers.

18. The sensor according to claim 1, wherein the photodetector comprises a photodiode having a metal anode formed from a material that includes TiN, Ni, Al, and/or Au.

19. The sensor according to claim 1, wherein the photodetector comprises a photodiode having hole-transport and electron-blocking layers for efficient collection of photogenerated holes and blocking electron injection from an anode.

20. The sensor according to claim 1, wherein the CQD structure comprises doping and/or thickness selection for the p-type layer optimized for a wide depletion region for efficient absorption of infrared light and collection of photogenerated holes.

21. The sensor according to claim 20, wherein the doping and/or thickness for the n-type layer is optimized for a wide depletion region for efficient absorption of infrared light and collection of photogenerated electrons.

22. The sensor according to claim 1, wherein the photodetector comprises a photodiode, wherein a cathode of the photodiode is a conductor transparent at an operating wavelength.

23. The sensor according to claim 19, wherein the cathode comprises a transparent conducting oxide, thin metal, nanoparticle film, doped semiconductor, and/or polymer.

24. The sensor according to claim 23, wherein the cathode comprises tin doped indium oxide (indium tin oxide, ITO), aluminum doped zinc oxide (AZO), Al, and/or Ag.

25. A method, comprising:
employing a LIDAR sensor including a photodetector array having one or more photodetectors comprising colloidal quantum dots (CQDs), wherein the photodetector array is responsive to light transmitted at a known time and received by the photodetector array after reflection from a target for determining a distance from the target to the sensor, or to light with an interference pattern in time and space produced by coherent mixing of light reflected from a target with light from an optical local oscillator for determining a distance from the target to the sensor based on phase or frequency relationships extracted from the interference pattern, wherein the photodetector array is formed on an integrated circuit,
wherein the photodetector comprises a photodiode including a depletion region between a weakly p-doped layer and a heavily doped n-type transparent conductive oxide.

26. The method according to claim 25, wherein the sensor includes a laser transmitter configured to transmit the light at a known time.

27. The method according to claim 25, wherein the sensor includes a laser transmitter configured to vary the frequency of the transmitted light over time such that the laser frequency at any given time is known.

28. The method according to claim 25, wherein the sensor includes a laser transmitter and an optical local oscillator, where the laser transmitter is configured to transmit light to a remote target with a known phase relationship at the time of transmission to the light of the optical local oscillator, and the laser and optical local oscillator are the same light source.

29. The method according to claim 25, wherein the sensor includes a laser transmitter and an optical local oscillator, where the laser transmitter is configured to transmit light to a remote target with a known phase relationship at the time of transmission to the light of the optical local oscillator, and the laser and optical local oscillator are different light sources.

30. The method according to claim 26, further including employing a signal processing circuit to determine the distance from the sensor to the target.

31. The method according to claim 27, further including employing a signal processing circuit to determine the distance from the sensor to the target or the relative velocity between sensor and target.

32. The method according to claim 25, wherein the sensor includes a laser transmitter and an optical local oscillator, where the laser transmitter is configured to transmit light to a remote target with a known phase relationship at the time of transmission to the light of the optical local oscillator, and further including a signal processing circuit to reconstruct a three-dimensional image of the target from an interferogram produced by coherent mixing of the reflected laser light with light from the optical local oscillator.

33. The method according to claim 25, wherein the integrated circuit comprises a readout integrated circuit (ROIC).

34. The method according to claim 33, wherein the ROIC comprises CMOS circuitry.

35. The method according to claim 25, wherein the photodetector array forms part of a focal plane array (FPA).

36. The method according to claim 25, wherein the photodetectors comprise photodiodes having an anode, a p-type layer, an n-type layer, and a cathode.

37. The method according to claim 36, wherein the CQD structure comprises a doped p-type layer, an n-type doped layer, and an electron-selective (hole-blocking) layer.

38. The method according to claim 37, wherein in the doped p-type layer and the n-type doped layer comprise lead sulfide CQDs.

39. The method according to claim 38, wherein the electron-selective (hole-blocking) layer comprises zinc oxide, C60 fullerenes, or phenyl-C61-butyric acid methyl ester (PCBM).

40. The method according to claim 39, wherein the lead sulfide doped p-type and the n-type doped layers and the zinc oxide layer comprise nanocrystal colloidal quantum dots packed in a film.

41. The method according to claim 25, wherein the photodetector includes a photodiode having a depletion region between weakly p- and n-doped layers.

42. The method according to claim 25, wherein the photodetector comprises a photodiode having a metal anode formed from a material that includes TiN, Ni, Al, and/or Au.

43. The method according to claim 25, wherein the photodetector comprises a photodiode having hole-transport and electron-blocking layers for efficient collection of photogenerated holes and blocking electron injection from an anode.

44. The method according to claim 25, wherein the CQD structure comprises doping and/or thickness selection for the p-type layer optimized for a wide depletion region for efficient absorption of infrared light and collection of photogenerated holes.

45. The method according to claim 44, wherein the doping and/or thickness for the n-type layer is optimized for a wide depletion region for efficient absorption of infrared light and collection of photogenerated electrons.

46. The method according to claim 25, wherein the photodetector comprises a photodiode, wherein a cathode of the photodiode is a conductor transparent at an operating wavelength.

47. The method according to claim 43, wherein the cathode comprises a transparent conducting oxide, thin metal, nanoparticle film, doped semiconductor, and/or polymer.

48. The method according to claim 47, wherein the cathode comprises tin doped indium oxide (indium tin oxide, ITO), aluminum doped zinc oxide (AZO), Al, and/or Ag.

* * * * *